May 2, 1944. C. A. TRAPP ET AL 2,347,976
EXPANSIBLE TANK FOR ELECTRICAL CONDENSERS
Filed Feb. 15, 1941
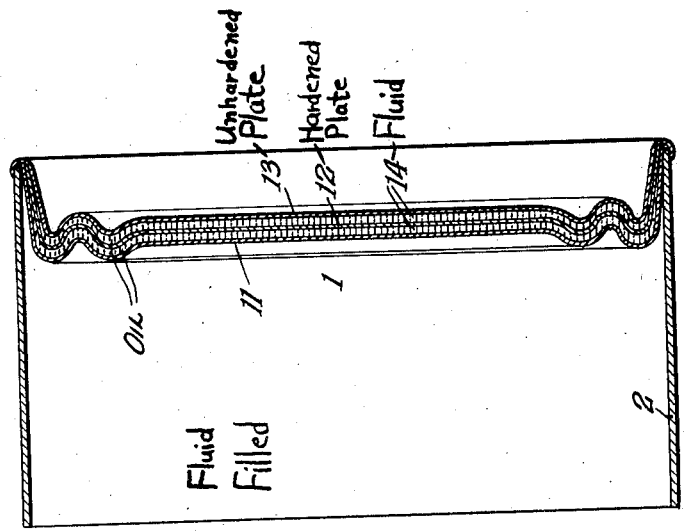
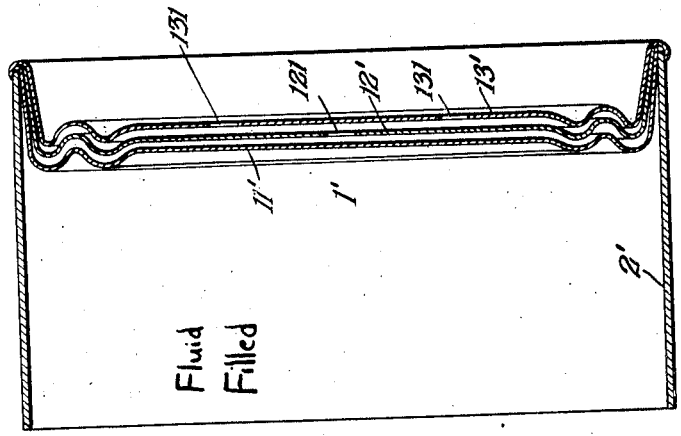
Inventor
CARL AKE TRAPP AND
BROR HANSSON Patented May 2, 1944

2,347,976

UNITED STATES PATENT OFFICE 2,347,976

EXPANSIBLE TANK FOR ELECTRICAL CONDENSERS

Carl Åke Trapp and Bror Hansson, Stockholm, Sweden, assignors to Allmänna Svenska Elektriska Aktiebolaget, Vasteras, Sweden, a corporation of Sweden Application February 15, 1941, Serial No. 379,032
In Sweden August 8, 1940

6 Claims. (Cl. 174—12)

The present invention relates to expansible tanks filled with insulating fluid for electrical condensers. Such tanks are ordinarily made from elastic steel plates, which independently of the volume (temperature) of the enclosed fluid is to maintain an overpressure on this fluid. It is very difficult to make the wall so strong that it stands a high pressure and at the same time is so flexible that it can take up the large changes in volume, which the fluid is submitted to when the temperature varies for instance between —35° C. and +50° C.

The following means have hitherto been used:
(a) Corrugating of the steel wall,
(b) Hardening of the wall,
(c) Careful selection and testing of the steel quality.

By hardening the flexible wall, the tank may be able to stand double pressure in comparison to unhardened wall, but the construction involves risk of crack formation. The use of a hardened steel wall is therefore very risky.

Adapting a principle well-known in the art, viz. forming a spring of a plurality of thin plate springs, the plate wall can be designed in such a manner that it can stand a considerably increased inner pressure in the tank. Instead of a single plate the wall is made according to the invention of two or several parallel flexible plates. As the dielectric strength of the condenser and thereby its load capacity is increased by pressure, a considerable increase in output of the condenser is thus obtained by this simple means.

Figure 1 is a cross sectional view of an end of a tank wall illustrating one form of the invention; and, Fig. 2 is a view similar to Fig. 1 but illustrating a second form of the invention.

Fig. 1 of the attached drawing illustrates a form of arrangement of the invention. The drawing shows a section of the circular expanding wall 1 of a plate tank of a condenser. The cylinder-shaped, non-flexible wall is marked 2. The flexible wall 1 is divided into three walls 11, 12, 13, which are corrugated similarly to each other and parallel and joined with each other and with the wall 2 of the tank at the circumference by means of welding or soldering or if suitable by means of seaming or folding.

The plates 11, 12 and 13 should be arranged close to each other. If a small intermediary space between the plates is allowed, this should be filled with fluid 14 according to one form of arrangement of the invention.

According to another form of arrangement of the invention, all the plates consist of hardened steel except one such as plate 13 which is unhardened. In this case, any great disaster may not occur if some of the hardened plates should burst.

According to another form of arrangement of the invention as shown in Fig. 2, wherein the elements corresponding to those in Fig. 1 are serially designated but with prime numbers, one or several of the outer plates 12', 13' are perforated as at 121, 131 or arranged with the inner plate or plates exposed to the atmospheric pressure. The outer plate or plates then serve for establishing a very high pressure at high temperatures and the inner plate for establishing a reasonable pressure at low temperatures.

We claim as our invention:

1. In an electrical condenser, a tank adapted to be filled with an insulating fluid subject to change in volume upon change in temperature, said tank including a side wall, the improvement which comprises a flexible end wall means having the inner side thereof exposed to the interior of said tank and the outer side thereof exposed to the atmosphere, said end wall means including a plurality of flexible plates having their edges affixed to one another and to said side wall, their central portions being respectively spaced from one another.

2. The combination claimed in claim 1, the spaces between each of said plates being filled with insulating fluid, whereby to transmit plate-stressing forces from plate to plate.

3. In an electrical condenser, a flexible tank adapted to be filled with insulating fluid and having at least one outer flexible wall comprising at least one hardened plate and an unhardened plate superimposed upon each other.

4. In an electrical condenser, a flexible tank adapted to be filled with insulating fluid and having at least one outer flexible wall comprising an inner plate and at least one perforated plate superimposed upon the inner plate so that atmospheric pressure acts directly upon said inner plate.

5. In an electrical condenser, a tank adapted to be filled with an insulating fluid subject to change in volume upon change in temperature, said tank including a cylindrical side wall of rigid material, the improvement which comprises a flexible end wall means having the inner side thereof exposed to the interior of said tank, said end wall means including a plurality of flexible annular plates substantially C-shaped in cross-section with relatively broad central portions and short end portions, the edges of said plates being affixed to said side wall adjacent an end thereof, the plates being superimposed upon one another with the central portions thereof spaced from one another and lying inwardly of said end.

6. The combination claimed in claim 5, the central portions of said plates being substantially flat and extending to adjacent the side wall of said tank.

CARL ÅKE TRAPP.
BROR HANSSON.